March 1, 1966     D. F. SUPPES ET AL     3,237,738
FRICTION COUPLING MECHANISM
Filed Aug. 14, 1963     5 Sheets-Sheet 1
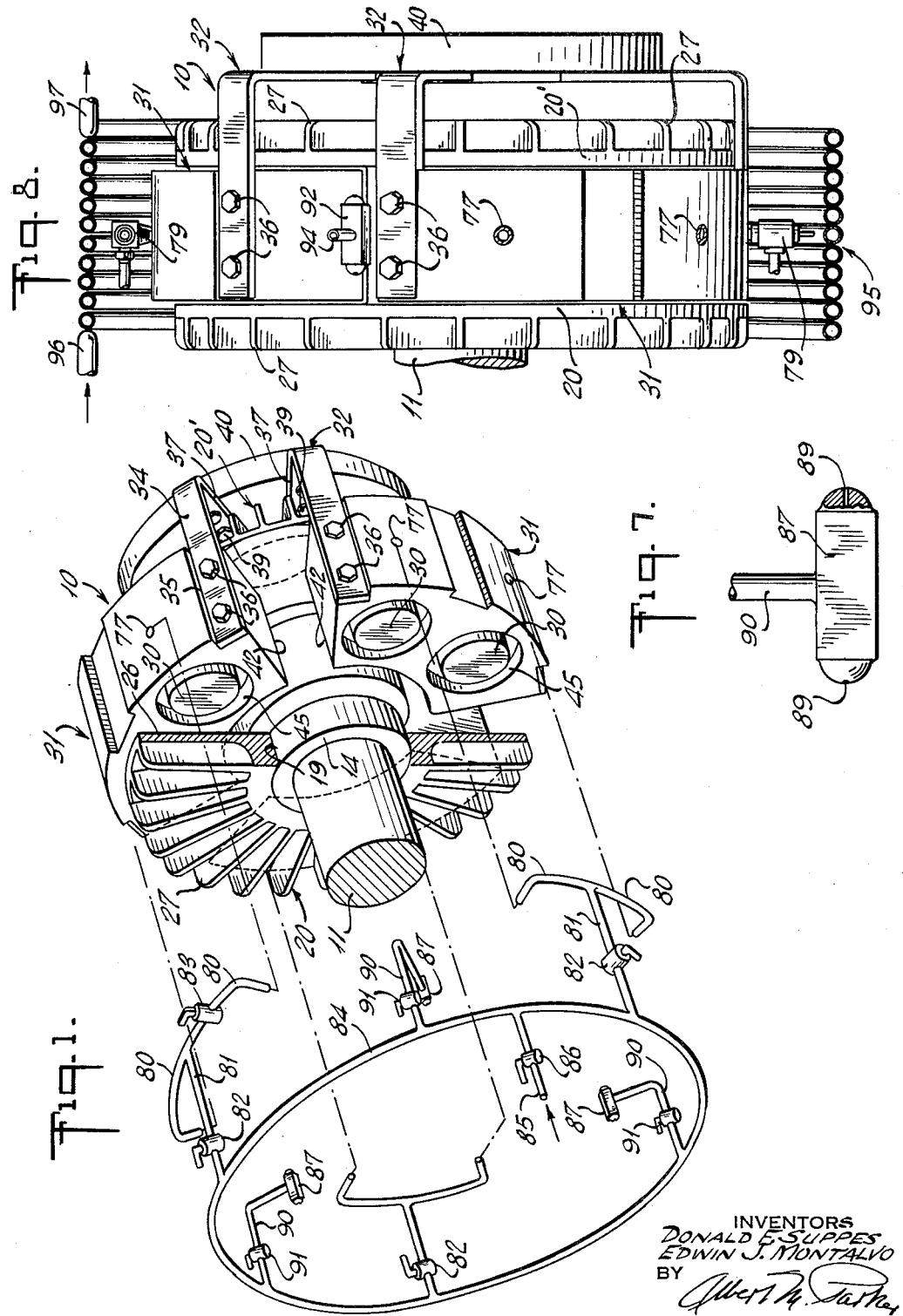
INVENTORS
DONALD F. SUPPES
EDWIN J. MONTALVO
BY
ATTORNEY

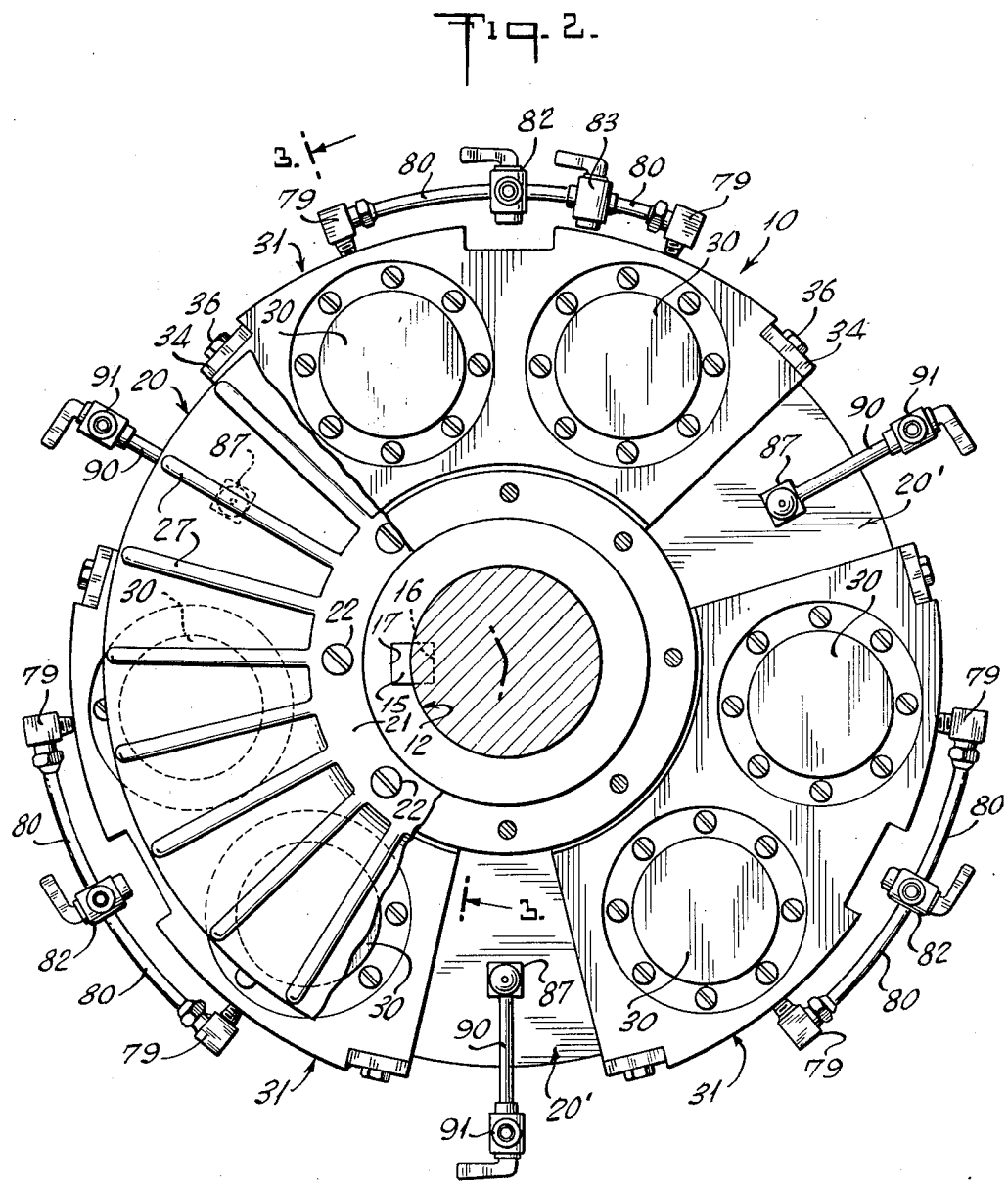

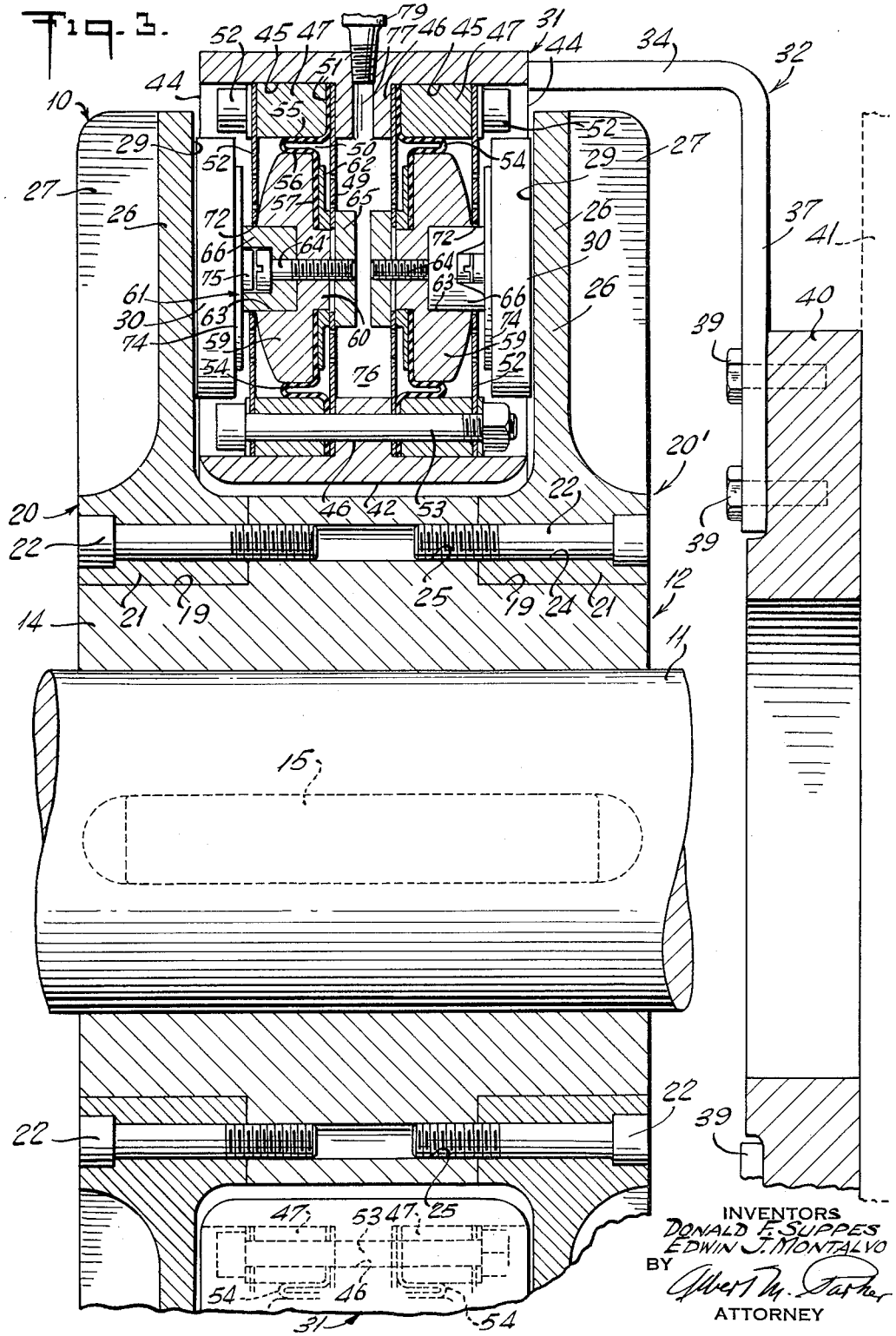

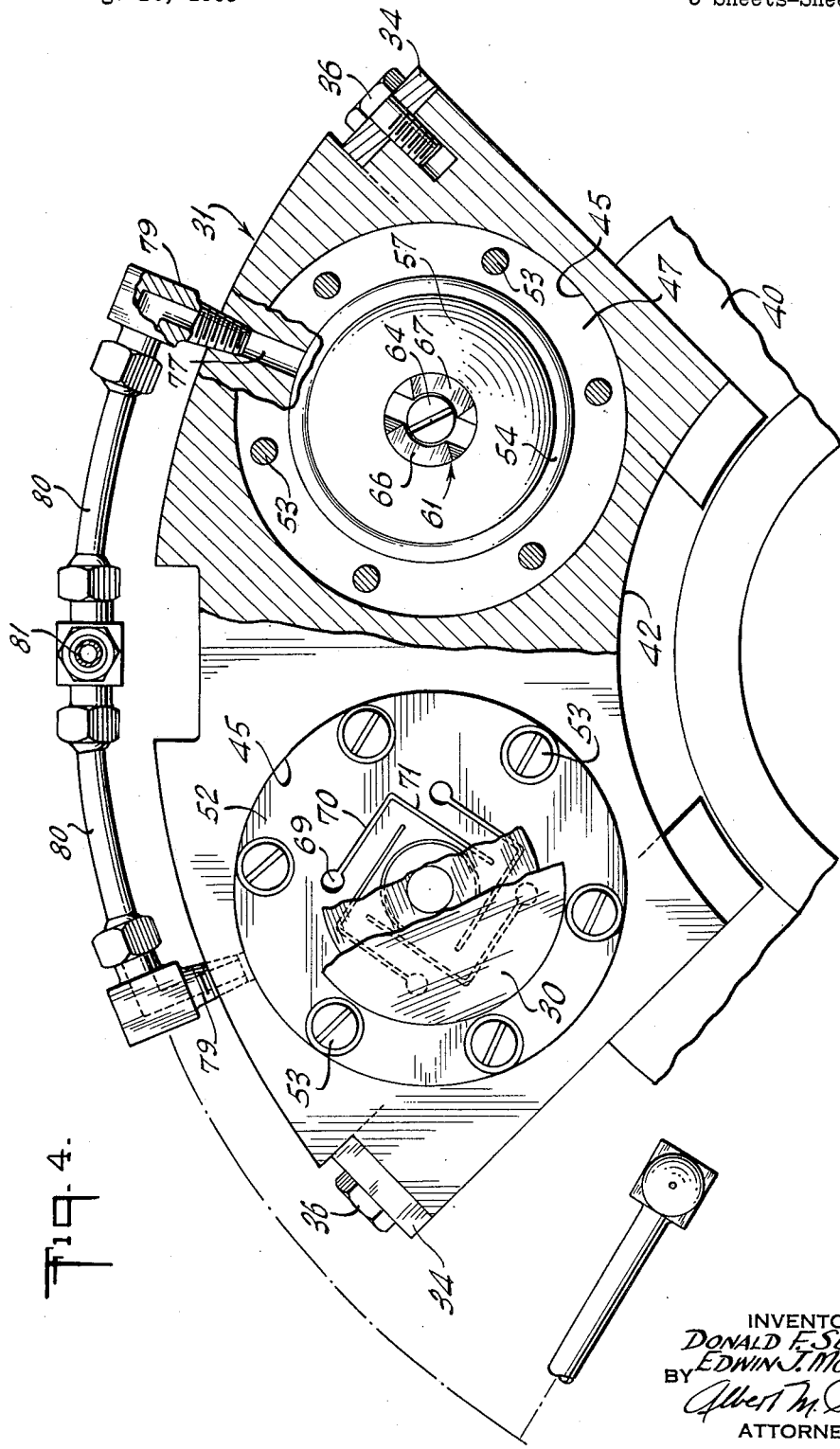

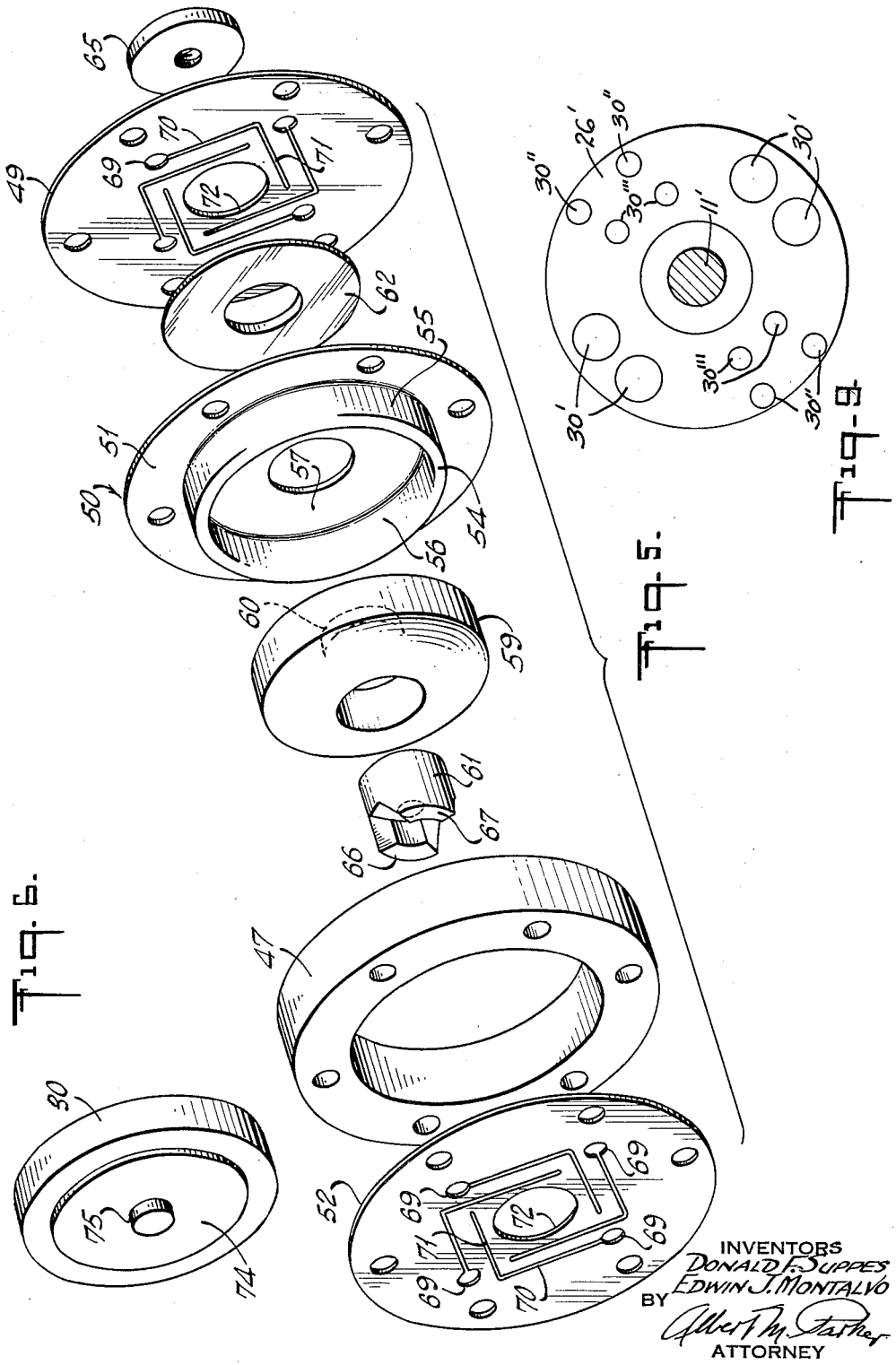

United States Patent Office 3,237,738
Patented Mar. 1, 1966

3,237,738
FRICTION COUPLING MECHANISM
Donald F. Suppes, 157 Coolidge Terrace, Wyckoff, N.J., and Edwin J. Montalvo, 283 Anderson St., Hackensack, N.J. (both % Montalvo & Co., Inc., City National Bank Bldg., Hackensack, N.J.)
Filed Aug. 14, 1963, Ser. No. 302,169
22 Claims. (Cl. 192—70)

This invention relates to a friction coupling mechanism. The invention includes within its scope brakes, wherein a rotatable element is selectively frictionally coupled to a relatively non-rotatable element, and clutches, wherein two rotatable elements are selectively coupled and uncoupled. The mechanism in accordance with the invention is illustrated herein by an embodiment thereof in the form of a brake for a rotatable shaft.

In the prior art, brakes and clutches have been made incorporating one or more frictional elements which are selectively applied to one or both surfaces of a rotatable friction plate. When the mechanism includes one or more friction elements applied to only one surface of the friction plate, the torque-transmitting capacity of the mechanism is limited. When, however, friction elements are applied to both broad surfaces of the plate, it is difficult to cool the friction plate to prevent an undue heat buildup with a consequent undesirable decrease in the frictional effect between the friction elements and the plate. Such latter type of mechanism includes, for example, the so-called caliper type of brake or clutch which applies friction elements to both sides of a friction plate at a limited area thereof in order to permit the atmosphere to have access to the remainder of the friction plate and thus to cool it. This, however, is a compromise, since only a small fraction of the total area of the friction plate is engaged by friction elements.

The present invention provides a friction coupling mechanism which is particularly characterized by its compactness, its relatively small overall diameter, and the efficiency of its cooling of the friction surfaces whereby the effectiveness of the mechanism is maintained despite continuous arduous use under frictional loads. The mechanism of the invention is further characterized by novel means for adjusting the total torque capacity thereof, while maintaining the force per unit area with which the friction surfaces are thrust together of a constant value.

The invention has among its objects the provision of a novel frictional coupling mechanism.

A further object of the invention lies in the provision of a frictional coupling mechanism which possesses high torque capacity and maintains such torque capacity during long periods of active use of the mechanism.

Another object of the invention lies in the provision of a frictional coupling mechanism incorporating novel cooling means for the frictional surfaces of the mechanism.

Still other objects of the invention reside in the provision of a novel frictional coupling mechanism which is particularly characterized by its compactness, its simplicity and ease of assembly and disassembly, its ruggedness, and by novel selectively operated control means whereby the effective torque capacity of the coupling mechanism may be widely varied within limits.

The above and further objects and novel features of the invention will more fully appear from the following description when the same is read in connection with the accompanying drawings. It is to be expressedly understood, however, that the drawings are for the purpose of illustration only, and are not intended as a definition of the limits of the invention.

In the drawings, wherein like reference characters refer to like parts throughout the several views, FIG. 1 is a fragmentary exploded view in perspective of a first embodiment of mechanism in accordance with the invention, said mechanism functioning as a brake, certain of the parts of the mechanism being broken away and/or omitted for clarity of illustration;

FIG. 2 is a view in front elevation of the mechanism of FIG. 1, the shaft to which the mechanism is connected being shown in transverse section, a part of the friction plate nearer the reader in the figure being broken away;

FIG. 3 is an enlarged view in section through the first embodiment of the mechanism, the section being taken along the broken section line 3—3 of FIG. 2;

FIG. 4 is an enlarged view partially in end elevation and partially in section parallel to the plane of the paper, the view showing the portion of the mechanism which appears at the top of FIG. 2, the friction plate of the mechanism nearer the reader being omitted;

FIG. 5 is an exploded view in perspective of the main parts making up a reciprocating fluid motor for thrusting its associated friction element against one of the friction plates of the mechanism;

FIG. 6 is a view in perspective of a friction element in the form of a disc which is employed in the illustrative embodiment of the mechanism;

FIG. 7 is a view in side elevation of a double-ended spray nozzle employed in cooling the friction plates in the first illustrative embodiment of the mechanism;

FIG. 8 is a view in side elevation of a second embodiment of friction coupling mechanism in accordance with the invention, parts of said mechanism being broken away for clarity of illustration, the fluid cooled shroud surrounding the mechanism being shown in diametral section, and FIG. 9 is a schematic view in front elevation of a modified construction of mechanism in accordance with the invention, said mechanism incorporating friction members located at different radial distances from the axis of the shaft, some of the friction elements having different effective areas from those of the other friction elements.

As above indicated the friction coupling mechanism of the invention may be employed either as a brake or as a clutch. Both embodiments of mechanism illustrated herein are adapted to function as brakes. In the embodiment of FIGS. 1 to 7, inclusive, the brake, generally designated by the reference character 10, is adapted selectively frictionally to couple a rotatable shaft 11 to a non-rotatable member 40 so as to bring the shaft 11 to a stop and to retain it from rotation. The mechanism 10 includes a rotor 12 which is affixed to shaft 11 in a manner more clearly shown in FIGS. 2 and 3.

Rotor 12 has an annular sleeve-like hub 14 which is secured to shaft 11 to rotate therewith by means of a key 15 which is disposed in a groove 16 in the shaft and a keyway 17 in the hub of the rotor. The hub 14 of rotor 12 has an annular seat 19 on each side thereof, each seat accurately receiving the inner thickened edge 21 of a respective one of the two similar friction plates 20, 20'. The friction plates are securely held on hub 14 and maintained against rotation with respect thereto by a plurality of studs 22 which extend inwardly through angularly spaced bores 24 in the inner edge portion 21 of each plate 20, 20' and are screwed into a threaded passage 25 in the hub 14.

The outer portion 26 of each plate 20, 20' is somewhat thinner than portion 21 thereof, portion 26 having a plurality of radially directed cooling fins 27 integrally attached to the outer face of the plate. The inner face 29 of each plate 20, 20' is flat, annular, and lies in a plane transverse to the axis of the shaft 11. The friction coupling mechanism 10 in the illustrative embodiment thereof includes a plurality (six shown) of opposed pairs of friction members 30 in the form of discs which are mounted on a body which is fixed from rotation relative to shaft 11, friction members 30 being selectively forcibly thrust outwardly into contact with the respective faces 29 of the opposed plates 20, 20'.

As shown in FIGS. 1 and 2, two pairs of opposed friction members 30 are mounted in each of three similar sector-shaped bodies 31 which are disposed coaxially of the shaft 11 and rotor 12 and are spaced at equal angles from each other. Each of the bodies 31 is supported on the above mentioned member 40 by means of two rigid L-shaped brackets or hangers 32. Each bracket 32 has an arm 34 extending parallel to shaft 11, the outer end of arm 34 being received within a groove 35 in the outer face of the respective body 31 and secured thereto by studs 36. The radially extending arm 37 of each bracket 32 is secured to member 40 by studs 39. The member 40 may have a central passage therethrough, as shown in FIG. 3, to receive shaft 11 therethrough should such be desired. Member 40, in turn, is secured to a fixed structure generally designated 41 (FIG. 3); member 41 may be, for example, a part of the frame of the apparatus with which the brake 10 is used. The brackets 32 hold the bodies 31 so that the side faces 44 of the latter are in alignment transverse to the axis of shaft 11 and are spaced a short distance inwardly from the inner face 29 of the respective friction plate 20.

Each of bodies 31 is provided with two angularly spaced sets of opposed fluid operated reciprocating motors of the diaphragm type which thrust the friction members 30 against the faces 29 of plates 20, 20'. The construction of such motors is most clearly shown in FIG. 3. As there shown, the body 31 has a bore 45 therein extending inwardly from each side surface of the body to a relatively axially thick central radially inwardly directed flange 46. An annular body 47 accurately fits within each bore 45, body 47 functioning to thrust the radially outer edge of an axially inner flat spring member 49 and the outer edge 51 of a rubber-like diaphragm 50 lying axially outwardly of spring 49 together and against the annular side surface of flange 46. The radially outer edge of a second, outer flat spring member 52, which is similar to member 49, overlies the axially outer face of member 47. The two similar reciprocating fluid motors thus formed have the parts thereof held together by a plurality of equally angularly spaced bolts 53 which extend in that order from the left to the right in FIG. 3 through passages in the outer edge of spring 52, member 47, flange 51 of diaphragm 50, the outer edge of spring 49, the flange 46 and the radially outer parts of the other, opposed similar motor in the reverse order from that above given for the first motor. Bolts 53 are secured by nuts on the right hand ends thereof, as shown.

The diaphragm 50 has a rounded annular fold 54 which is open in an axially inwardly direction. The outer side wall 55 of the diaphragm adjacent fold 54 and the inner side wall 56 thereof lie generally parallel to and radially spaced from each other. An annular plunger body 59 fitting with the inner side wall 56 of the diaphragm is disposed in bore 45 coaxial thereof and is maintained in such position by the above mentioned flat spring members 49 and 52. Plunger body 59 is made of non-magnetic material such as aluminum. Beyond the inner wall 56 the diaphragm 50 continues in a radially inwardly extending annular flange portion 57 which overlies and sealingly engages the radially outer annular axially inner surface of plunger body 59. The plunger body 59 has a central axially extending boss 60 which extends through a central hole in the flange 57 of the diaphragm 50.

The axially outer end of plunger body 59 is provided with a circular cylindrical seat 63 within which there is received a permanent magnet 61, which may be made, for example, of "Alnico." The magnet 61 has a shape which is most clearly shown in FIG. 5. The inner end of the magnet is in the form of a thick-walled circular cylindrical sleeve. The forward end of magnet 61, which has spaced opposite poles 66 and 67 of opposed magnetic polarity, extends through and closely fits within a central hole 72 in the flat spring 52. The motor plunger assembly is completed by a stepped washer 62 which lies between the inner flat spring member 49 and the inner flange 57 of the diaphragm 50 with the broader portion thereof in contact with the flange of the diaphragm, a bolt or screw 64, made of non-magnetic material such as brass, which extends through the axial passage in magnet 61 and has its head received within a central seat in the magnet between the opposed holes thereof, and a nut 65, the radially outer edge of which overlies the inner edge of the flat spring member 49.

The flat springs 49 and 52, which are made of non-magnetic material such as a conventional resilient beryllium-copper alloy, maintain the plunger body 59 in the retracted position shown in FIG. 3 when the chamber 76 between the inner ends of the opposed motors is subjected only to atmospheric pressure. When, however, chamber 76 is subjected to appreciable fluid pressure by being connected to a source of compressed air, the plunger body 59 is thrust axially outwardly so as strongly to force its friction element 30 against the confronting face 29 of its respective friction plate 20, 20'.

The flat spring members 49 and 52, which may be of identical construction as shown in FIG. 5, each has a central opening 72 therethrough. Each plate has a plurality of holes 69 spaced radially outwardly from hole 72 and spaced angularly at 90° from each other. From each hole 69 there extends a chordally disposed slot 70 and a second chordally disposed slot 71 at right angles to slot 70, each slot 71 lying intermediate a slot 70 from an adjoining hole 69 and the central hole 72 through the flat spring member. As a result of such construction, the central part of the disc is, in effect, supported by four equally angularly spaced fingers which connect it to the outer peripheral portion of the spring member. Thus the central portion of the spring member may yield appreciably in an axial direction with respect to the outer peripheral portion thereof.

The friction element 30 has a disc member 74 with a central boss 75 affixed thereto, the disc and boss both being made of magnetic metal. The boss 75 has a diameter such that it is received within the seat provided between the poles 66 and 67 of the magnet and the head of the bolt 64, with at least a slight freedom of radial and angular movement with respect to the magnet. The magnet 61 thus retains the friction element securely in place while permitting it to adjust itself slightly as may be required as the friction element wears.

Fluid flows between the chamber 76 and the inner surface of each of the diaphragms 50 of the opposed fluid motors in each pair thereof through the holes 69 and slots 70 and 71 in the flat spring members 49 of each of the motors. The chamber 76 between the inner ends of each pair of opposed motors is supplied with fluid under pressure through a pasasge 77 extending radially through the flange 46. A fitting 79 is screwed into the outer end of passage 77. The fittings 79 of the two chambers 76 in each body 31 are connected by a cross-pipe 80 to which a branch supply pipe 81 is connected. As shown most clearly in FIG. 1, each branch supply pipe 81 is connected to a manifold or bustle pipe 84 through a shut-off valve 82. The manifold 84, in turn, is supplied with fluid under pressure from a source, not shown, through a main supply pipe 85 provided with a main control valve 86. When the valves 82 are suitably manipulated two, four, or six of the opposed pairs of fluid motors of the mechanism 10 may be operated when the valve 86 is opened. In order to permit the operation of the mechanism 10 with any number from one to six of the opposed pairs of fluid motors in operative condition, there is provided a shut-off valve 83 in the branch line 80 leading to one pair of fluid motors, as shown in FIG. 1, whereby such one opposed pair of fluid motors may be selectively made to be operative or inoperative.

Preferably the mechanism 10 is provided with cooling means for plates 20 in addition to the above mentioned cooling fins 27 thereon. Such cooling means takes the form of three double-ended nozzles 87 one of which is located in each of the spaces between the confronting radial end surfaces of the successive bodies 31. One such nozzle 87 is shown in FIG. 7. As there shown, each end of the nozzle body is provided with a nozzle opening 89. The nozzle body is provided with fluid under pressure such as compressed air, such fluid being discharged through nozzle openings 89 against the inner faces 29 of the plates 20. A convenient and preferred manner of supplying nozzles 87 with fluid is illustrated in FIG. 1, wherein the pipe 90 which supplies each double-ended nozzle 87 is connected to the manifold 84 through a manually operated shut-off valve 91. Thus when the shut-off valves 91 are opened, the opening of the main control valve 86 not only supplies fluid under pressure to the chamber 76 of each operative pair of opposed fluid motors, but also causes cooling fluid to be discharged from the nozzles 87 against the friction plates 20, 20', as described.

The friction coupling mechanism 10 shown in FIG. 8 is per se the same as that shown in FIGS. 1 to 7, inclusive, and above described. Consequently, the parts of the mechanism 10 in FIG. 8 are only generally indicated, and are designated with the same reference characters as in the first described embodiment. The mechanism 10 of FIG. 8 is cooled not only by the cooling fins 27 on the friction plates 20, 20', but by one or more liquid jet spray means 92, which are disposed in the same manner as the previously described spray means 87 of the embodiment of FIGS. 1 to 7, inclusive. Spray means 92 are supplied with liquid under pressure through pipes of which one is shown at 94; means 92 discharge liquid in the form of a spray against the inner face of the friction plates 20, 20'.

The thus sprayed cooling liquid may be, for example, water. During long hard use of the coupling mechanism 10, as, for example, in bringing heavy rotating parts to rest, the friction plates becoming heated highly enough to volatize the liquid sprayed against them. When water is thus employed to cool the plates 20, 20', it tends to be turned into steam under such conditions. The apparatus of FIG. 8 localizes the steam thus produced, and condenses a large portion of it. To accomplish this result there is disposed a shroud 95 about and coaxially of the mechanism 10, the shroud being formed of a plurality of closely spaced helical turns of tubing which are supplied with cooling fluid such as a refrigerated liquid through an inlet pipe 96, the cooling fluid being discharged from the shroud through pipe 97. Steam generated by the described action of the coupling mechanism will tend to be thrown outwardly from the rotating plate 20 against the cooled shroud 95, and to be condensed thereby. The condensate from such steam may be collected in a suitable sump (not shown) beneath the fluid.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

The mechanism of the invention may be employed as a clutch by securing the member 40 to a second shaft which is rotatable with respect to shaft 11, and to which the shaft 11 is to be selectively connected. Fluid under pressure may be supplied to the manifold 84, which in this embodiment rotates with the bodies 31 and the second shaft, through a central pipe located on the axis of the shafts and connected to the manifold through a conventional fluid tight swivel joint.

The friction members 30 may, if desired, be located at different radial distances from the axis of shaft 11, and various ones of the friction elements and of the motors thrusting the friction elements against the friction plates may have effective areas and thrusting forces, respectively, which are different from the others, thereby to provide the friction coupling mechanism with a more closely graduated range of torque capacities than by the variation in number of the operative pairs of opposed friction members 30 acting upon the friction plates 20, 20'.

The modified structure described in the previous paragraph is shown in FIG. 9. As there shown, the friction plate 26' is fixedly secured to shaft 11' so as to rotate therewith. A plurality of friction members 30', 30", and 30''' mounted on a member (not shown) coaxial of shaft 11' selectively cooperate with the friction plate 26'. The member 30' are similar to members 30 of the first described embodiment. The friction members 30" are of smaller effective area than members 30', and are disposed at a greater distance radially of shaft 11' from the axis thereof than are friction members 30'. Members 30''', of the same effective area as members 30", are disposed at a smaller radial distance than members 30'.

Although a valve 83 has been shown in only one of the branch lines 80 leading to one pair of fluid motors, a similar valve may, if desired, be included in each of the branch lines 80, so as selectively to render any one of the opposed pairs of fluid motors operative or inoperative. This permits the wear to be more evenly distributed among the pressure members, assuming that the apparatus is used with less than all of the opposed pairs of fluid motors in operative condition at one time.

We claim as new the following:

1. A mechanism for selectively frictionally coupling two relatively rotatable bodies, comprising two parallel friction plates fixedly connected to a first one of said bodies transverse to the axis of relative rotation of said bodies, the second of said bodies having a portion positioned between the inner faces of the friction plates and carrying a plurality of pairs of opposed friction members, one of each of said pairs of friction members confronting the axially inner face of one of the friction plates, and the other of each of said pairs of friction members confronting the axially inner face of the other of the friction plates, and means for simultaneously thrusting the friction members in opposite directions into contact with the faces of the friction plates which they confront, said last named means including a source of power and thrust means for each friction member energized by said source of power for simultaneously thrusting the friction elements into contact with the respective friction plates.

2. A mechanism as claimed in claim 1, comprising means to disconnect the source of power from selected ones of said thrust means, whereby to vary the number of friction members operatively associated with the friction plates.

3. A mechanism as claimed in claim 1, comprising means to cool the friction plates.

4. A mechanism as claimed in claim 3, wherein the cooling means comprises fins on the outer face of each friction plate.

5. A mechanism as claimed in claim 3, wherein the cooling means comprises means to spray a jet of cooling fluid on each of the friction plates.

6. A mechanism as claimed in claim 3, wherein the cooling means comprises means to spray a jet of cooling fluid on the inner face of each of the friction plates.

7. A mechanism as claimed in claim 1, wherein the means for simultaneously thrusting the friction members against the respective friction plates comprises fluid actuated reciprocating motors disposed in alignment with the respective friction members, and means simultaneously to supply the motors with fluid under pressure.

8. A mechanism as claimed in claim 1, comprising cooling means for the friction plates, said cooling means including jet means for directing a spray of liquid upon the inner face of each of the friction plates.

9. Apparatus as claimed in claim 8, wherein the liquid is volatilizable, and comprising means shrouding the frictional coupling mechanism and disposed thereabout for condensing volatilized liquid impinging upon such shrouding means.

10. Apparatus as claimed in claim 9, wherein the means shrouding the frictional coupling mechanism comprises an annular band disposed about the mechanism generally coaxially thereof and appreciably spaced radially therefrom, said band being formed of a plurality of helical turns of tubing, and means to circulate a cooling fluid through said turns of tubing.

11. A mechanism as claimed in claim 1, wherein the means for simultaneously thrusting the friction elements against the respective friction plates comprises pressure fluid actuated motor means, a source of fluid under pressure, valve means selectively to connect the motor means to the source of fluid under pressure, means to cool the friction plates comprising jet means to spray fluid from said fluid source on each of the friction plates, and conduit means connecting the jet means in parallel with the fluid motor means beyond the valve means, whereby the motor means and the jet means are controlled by the valve simultaneously with the motor means.

12. A mechanism as claimed in claim 1, wherein the means for thrusting the friction members includes opposed thrust motors for each opposed pair of friction elements energized by said source of power for simultaneously thrusting the friction members of each pair thereof into contact with the respective friction plates.

13. A mechanism as claimed in claim 12, comprising means to disconnect the source of power from selected ones of said thrust motors, whereby to vary the number of opposed pairs of friction members operatively associated with the friction plates.

14. A mechanism as claimed in claim 1, wherein the opposed aligned fluid actuated reciprocating motors are disposed in alignment with the friction elements, and means simultaneously to supply the axially inner ends of the motors with fluid under pressure.

15. A mechanism for selectively coupling two relatively rotatable bodies, comprising two parallel friction plates fixedly connected to a first one of said bodies transverse to the axis of relative rotation of said bodies, means connected to the second of said bodies and carrying a plurality of friction members at least some of which are spaced from each other and confront different zones of the axially inner face of one of the friction plates, and the others of which are spaced from each other and confront different zones of the axially inner face of the other of the friction plates, and means for simultaneously thrusting the friction members into contact with the faces of the friction plates which they confront.

16. A mechanism as claimed in claim 15, wherein the second body has a portion positioned between the inner faces of the friction plates, and wherein the friction members are mounted on said portion of the second body.

17. A mechanism as claimed in claim 16, wherein said portion of the second body is composed of parts substantially separated from each other and angularly spaced about the friction plates, and means connecting said parts of the second body together.

18. A mechanism as claimed in claim 17, comprising means disposed between adjacent ones of the said parts of the second body to spray a jet of cooling fluid on the inner face of each of the friction plates.

19. A mechanism for selectively frictionally coupling two relatively rotatable bodies, comprising a friction plate fixedly connected to a first one of said bodies transverse to the axis of relative rotation of said bodies, means connected to the second of said bodies and carrying a friction member which confronts a face of the friction plate, and means for thrusting the friction member into contact with said face of the friction plate which it confronts, said last named means comprising a source of power and thrust means for said friction member energized by said source of power, and means connecting the friction member to the thrust means so as to permit a limited universal rocking of the friction member with respect to the thrust means, said last named means comprising a socket in one of said means and a central projection on the other of said means, said projection being loosely received within the socket, and magnetic means for retaining the projection in the socket.

20. A mechanism as claimed in claim 19, wherein the thrust means includes a central plunger disposed in alignment with the friction member, and comprising means connecting the friction member to the plunger for movement therewith toward and away from the friction plate, and resilient means for retaining the plunger with the friction member connected thereto retracted from the friction plate when the thrust means is deenergized.

21. A mechanism as claimed in claim 20, wherein the resilient means comprises a thin disc-like spring disposed coaxial of and centrally connected to the plunger, the rim of the spring being connected to the second body.

22. A mechanism as claimed in claim 20, wherein the resilient means comprises two parallel thin disc-like springs disposed coaxial of and centrally connected to the plunger, one such spring being disposed at each of the respective ends of the plunger, the rims of the springs being connected to the second body.

References Cited by the Examiner

UNITED STATES PATENTS

| | | | |
|---|---|---|---|
| 2,106,472 | 1/1938 | Airman | 192—70 X |
| 2,785,781 | 3/1957 | Johansen | 192—88 X |
| 2,956,650 | 10/1960 | Wilson | 192—113 X |
| 2,997,138 | 8/1961 | Cagle | 188—73 |
| 3,063,532 | 11/1962 | Jaeschke | 192—113.2 |
| 3,112,014 | 11/1963 | Jeffries | 188—73 |

DON A WAITE, *Primary Examiner.*

DAVID J. WILLIAMOWSKY, *Examiner.*